(12) United States Patent
Agrawal et al.

(10) Patent No.: US 10,598,526 B2
(45) Date of Patent: Mar. 24, 2020

(54) METHODS AND SYSTEMS FOR PERFORMING TEST AND CALIBRATION OF INTEGRATED SENSORS

(71) Applicant: International Business Machines Corporation, Armonk, NY (US)

(72) Inventors: Mitesh Agrawal, Bangalore (IN); Preetham M. Lobo, Bangalore (IN); Franco Motika, Hopewell Junction, NY (US); John D. Parker, Fishkill, NY (US); Gerard M. Salem, Essex Junction, VT (US); Tobias Webel, Schwaebisch-Gmuend (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/063,731

(22) Filed: Mar. 8, 2016

(65) Prior Publication Data
US 2017/0261354 A1    Sep. 14, 2017

(51) Int. Cl.
*G01D 18/00*    (2006.01)

(52) U.S. Cl.
CPC .................. *G01D 18/008* (2013.01)

(58) Field of Classification Search
CPC .................................................. G01D 18/008
USPC ......................................... 702/45, 104, 188
See application file for complete search history.

(56) References Cited

U.S. PATENT DOCUMENTS

| 4,523,313 A | 6/1985 | Nibby, Jr. et al. |
| 5,425,036 A | 6/1995 | Liu |
| 5,757,181 A | 5/1998 | Wolf et al. |
| 5,805,789 A | 9/1998 | Huott et al. |
| 6,643,807 B1 | 11/2003 | Heaslip et al. |
| 6,882,950 B1 | 4/2005 | Jennion et al. |
| 6,968,286 B1 | 11/2005 | Watkins |

(Continued)

OTHER PUBLICATIONS

Franco Motika et al., "Methods and Systems for Generating Functional Test Patterns for Manufacture Test", U.S. Appl. No. 15/063,692, filed Mar. 8, 2016.

(Continued)

*Primary Examiner* — Dzung Tran
(74) *Attorney, Agent, or Firm* — Cantor Colburn LLP; Margaret McNamara

(57) ABSTRACT

Embodiments include methods, and computer system, and computer program products for performing test and calibration of integrated sensors on a processor chip. Aspects include: initializing, by a tester program, an on-chip service engine of processor chip, performing and completing, by on-chip service engine, test and calibration of integrated sensors. The method may also include: loading and decoding tester program into an on-chip service engine memory, testing and calibrating each integrated sensor, which may include: selecting an integrated sensor for test and calibration, loading sensor test and calibration patterns and parameters, and sensor test code, and executing the sensor test code to test and calibrate integrated sensors, writing results of the test and calibration to a predetermined location of the on-chip service engine memory, and writing a return code of test and calibration to another predetermined location of on-chip service engine memory, when every integrated sensor is tested and calibrated.

12 Claims, 3 Drawing Sheets

(56) References Cited

U.S. PATENT DOCUMENTS

| | | | |
|---|---|---|---|
| 7,080,301 B2 | 7/2006 | Dervisoglu et al. | |
| 7,093,174 B2 | 8/2006 | Fenech Saint Genieys | |
| 7,305,600 B2 | 12/2007 | Farnsworth, III et al. | |
| 7,383,144 B2 | 6/2008 | Lorenz | |
| 7,484,153 B2 | 1/2009 | Kiryu et al. | |
| 7,610,537 B2 | 10/2009 | Dickinson et al. | |
| 7,640,476 B2 | 12/2009 | Watkins | |
| 7,769,557 B2 | 8/2010 | Bey et al. | |
| 7,921,346 B2 | 4/2011 | Forlenza et al. | |
| 8,405,413 B2 | 3/2013 | Carpenter et al. | |
| 8,769,360 B2 | 7/2014 | Motika et al. | |
| 8,868,975 B2 | 10/2014 | Bellofatto et al. | |
| 9,069,041 B2 | 6/2015 | Douskey et al. | |
| 9,857,422 B2 | 1/2018 | Motika et al. | |
| 10,247,624 B2 | 4/2019 | Abdelmoneum et al. | |
| 2001/0010091 A1 | 7/2001 | Noy | |
| 2002/0091979 A1 | 7/2002 | Cook et al. | |
| 2003/0158683 A1 | 8/2003 | Gauthier et al. | |
| 2004/0103218 A1 | 5/2004 | Blumrich et al. | |
| 2004/0225973 A1 | 11/2004 | Johnson | |
| 2006/0190792 A1 | 8/2006 | Arnold et al. | |
| 2006/0213972 A1* | 9/2006 | Kelley | G06K 7/0008 235/380 |
| 2007/0271070 A1* | 11/2007 | Dmytriw | G01F 15/022 702/188 |
| 2008/0126911 A1 | 5/2008 | Brittain et al. | |
| 2008/0127103 A1 | 5/2008 | Bak et al. | |
| 2008/0317086 A1 | 12/2008 | Santos et al. | |
| 2011/0016153 A1 | 1/2011 | Atta et al. | |
| 2011/0296259 A1 | 12/2011 | Balakrishnan et al. | |
| 2012/0043982 A1 | 2/2012 | Carpenter et al. | |
| 2012/0290268 A1* | 11/2012 | Bey | G01D 11/245 702/189 |
| 2013/0031418 A1* | 1/2013 | Bellofatto | G06F 11/2242 714/40 |
| 2013/0227367 A1 | 8/2013 | Czamara et al. | |
| 2013/0268357 A1 | 10/2013 | Heath | |
| 2014/0097691 A1 | 4/2014 | Jackson et al. | |
| 2014/0237302 A1 | 8/2014 | Berry, Jr. et al. | |
| 2014/0298124 A1 | 10/2014 | Douskey et al. | |
| 2014/0344824 A1* | 11/2014 | Brock | G06F 9/46 718/103 |
| 2014/0351664 A1* | 11/2014 | Akdemir | G01R 31/31908 714/724 |
| 2017/0238108 A1 | 8/2017 | Muza | |
| 2017/0261551 A1 | 9/2017 | Agrawal | |
| 2017/0261552 A1 | 9/2017 | Motika | |
| 2018/0067162 A1 | 3/2018 | Motika | |

OTHER PUBLICATIONS

List of IBM Patents or Patent Applications Treated as Related; (Appendix P), Filed May 2, 2016; 2 pages.
Mitesh A. Agrawal et al., "Performing System Functional Test on a Chip Having Partial-Good Portions", U.S. Appl. No. 15/063,666, filed Mar. 8, 2016.
List of IBM Patents or Patent Applications Treated as Related; (Appendix P), Filed Sep. 19, 2017; 2 pages.
Franco Motika et al., "Methods and Systems for Generating Functional Test Patterns for Manufacture Test", U.S. Appl. No. 15/169,842, filed Jun. 1, 2016.
Xin Cai, "A serial bitstream processor for smart sensor systems", 2010, 280 pages.
IBM "List of IBM Patents or Patent Applications Treated as Related; (Appendix P)", Filed Jun. 25 2018, 2 pages.
Mitesh Agrawal et al., "Methods and Systems for Performing Test and Calibration of Integrated Sensors," U.S. Appl. No. 16/017,102, filed Jun. 25, 2018.
List of IBM Patents or Patent Applications Treated as Related; (Appendix P), Filed May 7, 2018; 2 pages.
Crafts J. et al. "Testing the IBM Power 7 TM 4 GHz Eight Core Microprocessor", 2010 IEEE International Test conference (ITC), Nov. 2-4, 2010. DOI: 10.1109/TEST.2010.5699204 See pp. 3-5.
Bharath et al. "A low cost approach to calibrate on-chip thermal sensors" 12th International Symposium on Quality Electronic Design. IEEE, 2011. (5 pages).
Datta et al., "Calibration of on-chip thermal sensors using process monitoring circuits." 11th international symposium on quality electronic design (ISQED). IEEE, 2010. pp. 461-467.
Lobo et al. "SBE assist function patent discussion—minutes of meeting" lotus notes Mar. 17, 2015 (2 pages).

* cited by examiner

METHODS AND SYSTEMS FOR PERFORMING TEST AND CALIBRATION OF INTEGRATED SENSORS

BACKGROUND

The present disclosure relates generally to chip manufacturing, and more particularly to methods, systems and computer program products for performing test and calibration of integrated sensors on a processor chip.

The rapid densification of very-large-scale integration (VLSI) devices, incorporating complex functions operating at extreme circuit performance, has driven the designs towards integrating many diverse functional macros or cores within these large chips. These macros range from autonomous processor cores with large cache arrays occupying relatively large portions of the chip's real estate, to a multitude of small arrays used as register stacks, trace arrays, content addressable memories, phase locked loops (PLLs), and many other special purpose logic functions. In conjunction with these higher integration densities and larger devices, current system architecture is shifting, in many applications, toward massively parallel processing utilizing multiple copies of these integrated cores. The number of processing cores can range from dual-cores to hundreds of cores per chip in the near future and to thousands of core arrays at system level. The independent logic units may include register stacks, trace arrays, content addressable memories, PLLs, as well as various integrated sensors (or on-chip sensors) such as Critical Path Monitors (CPM) and Digital Temperature Sensors (DTS) used for real time monitoring and environmental optimization.

The problem addressed by this disclosure is encountered while utilizing on-chip sensors to optimize the power and performance of the device. Specifically, the problem is to accurately and rapidly test and calibrate the various sensors during test.

Therefore, heretofore unaddressed needs still exist in the art to address the aforementioned deficiencies and inadequacies.

SUMMARY

In an embodiment of the present invention, a method for performing test and calibration of one or more integrated sensors on a processor chip may include: initializing, by a tester program, an on-chip service engine of the processor chip for performing test and calibration of the integrated sensors, performing, by the on-chip service engine, test and calibration of the integrated sensors, and completing the test and calibration of the of the integrated sensors. The method may also include: loading and decoding the tester program into an on-chip service engine memory, testing and calibrating each integrated sensor, which may include: selecting an integrated sensor, loading sensor test and calibration patterns and parameters, and sensor test code for the selected integrated sensor, and executing the sensor test code to test and calibrate the integrated sensor selected according to the test and calibration patterns and parameters loaded, writing results of the test and calibration to a predetermined location of the on-chip service engine memory, and writing a return code of the test and calibration of the integrated sensors to another predetermined location of the on-chip service engine memory, when every integrated sensor is tested and calibrated.

In another embodiment of the present invention, a computer system for performing test and calibration of one or more integrated sensors on a processor chip may include a processor, and a memory storing a tester program for the computer system. When the tester program is executed at the processor, the tester program may cause the computer system to perform: initializing, by the tester program, an on-chip service engine of the processor chip for performing test and calibration of one or more integrated sensors on the processor chip, performing, by the on-chip service engine, test and calibration of the integrated sensors, and completing the test and calibration of the of the integrated sensors. The tester program may cause the computer system to perform: loading and decoding the tester program into an on-chip service engine memory, testing and calibrating each integrated sensor, which may include: selecting an integrated sensor, loading sensor test and calibration patterns and parameters, and sensor test code for the selected integrated sensor, and executing the sensor test code to test and calibrate the integrated sensor selected according to the test and calibration patterns and parameters loaded, writing results of the test and calibration to a predetermined location of the on-chip service engine memory, and writing a return code of the test and calibration of the integrated sensors to another predetermined location of the on-chip service engine memory, when every integrated sensor is tested and calibrated.

In yet another embodiment of the present invention, a non-transitory computer readable storage medium may store a tester program. When the tester program is executed by a processor of a computer system, the tester program causes the computer system to perform: initializing, by the tester program, an on-chip service engine of a processor chip for performing test and calibration of one or more integrated sensors on the processor chip, performing, by the on-chip service engine, test and calibration of the integrated sensors, and completing the test and calibration of the of the integrated sensors. The tester program may cause the computer system to perform: loading and decoding the tester program into an on-chip service engine memory, testing and calibrating each integrated sensor, which may include: selecting an integrated sensor, loading sensor test and calibration patterns and parameters, and sensor test code for the selected integrated sensor, and executing the sensor test code to test and calibrate the integrated sensor selected according to the test and calibration patterns and parameters loaded, writing results of the test and calibration to a predetermined location of the on-chip service engine memory, and writing a return code of the test and calibration of the integrated sensors to another predetermined location of the on-chip service engine memory, when every integrated sensor is tested and calibrated.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
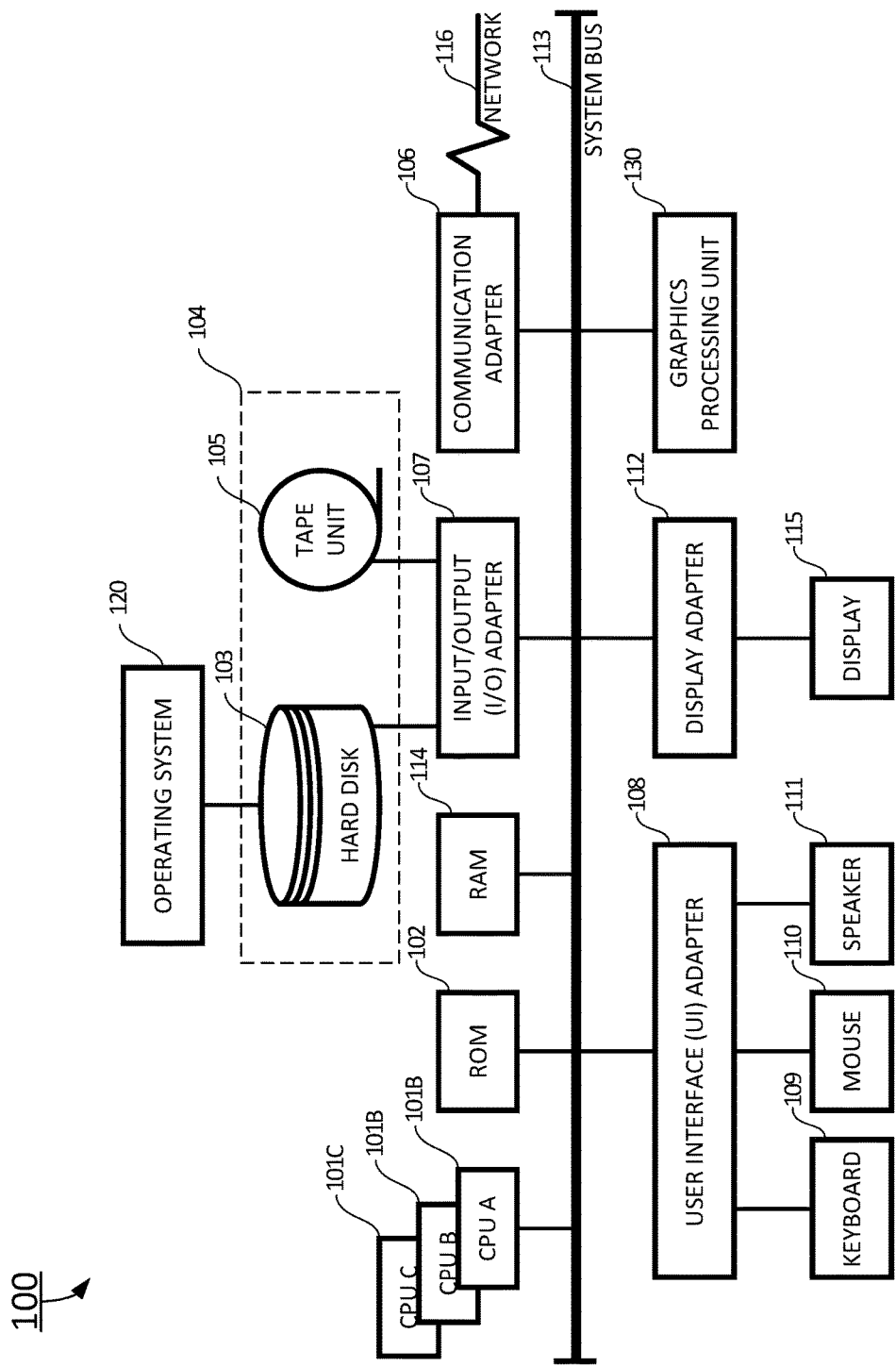
FIG. 1 is a block diagram illustrating an exemplary computer system for performing test and calibration of certain integrated sensors on a processor chip according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, an embodiment of a computer system 100 for performing test and calibration of integrated sensors in a multi-core test environment and implementing the teachings is shown. In this embodiment, the computer system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

In certain embodiments, the computer system 100 may be connected to a test and calibration device where a processor chip is been tested (not shown in FIG. 1).

Figure 2:
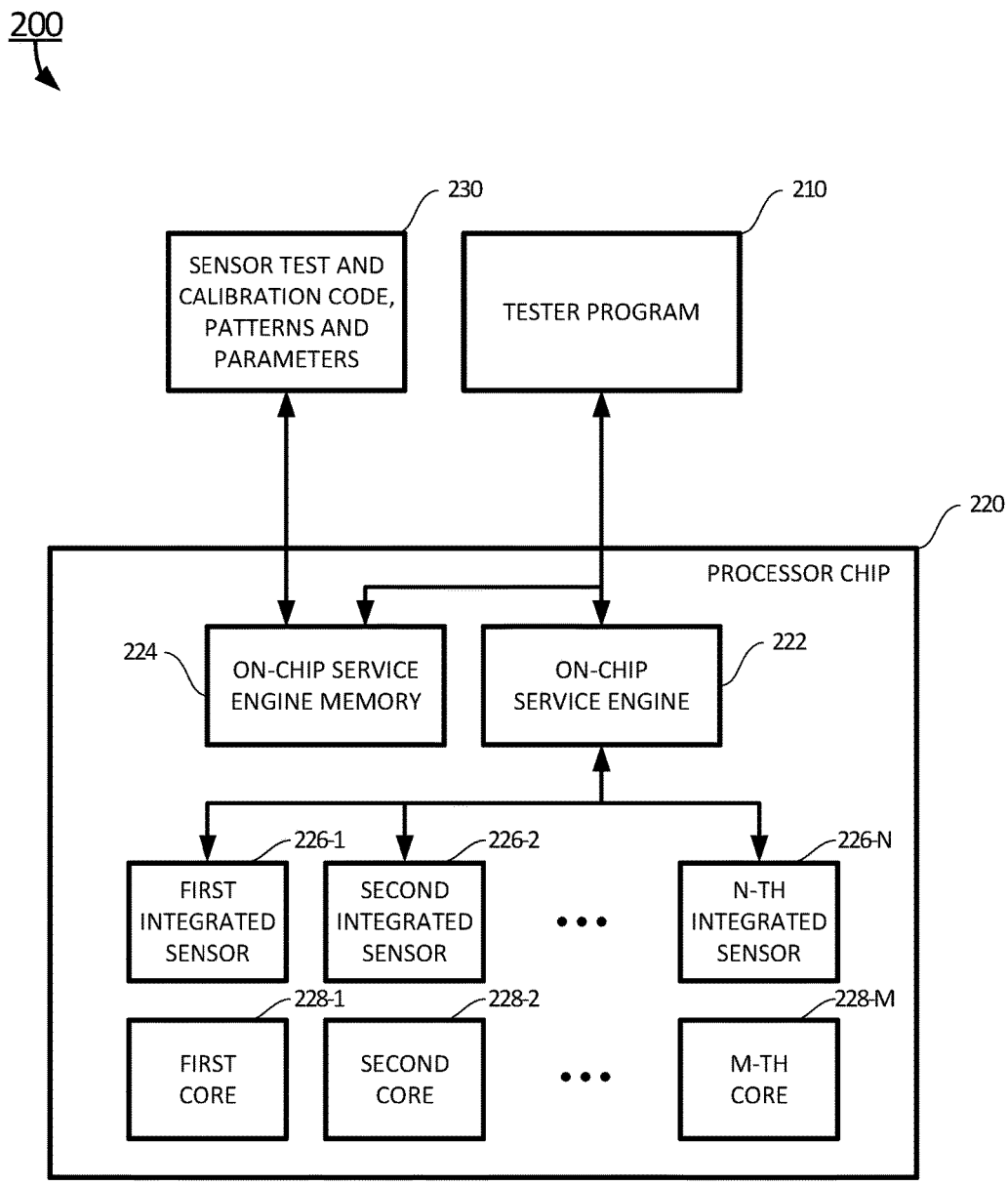
FIG. 2 is a structure view of a processor chip and a tester program for performing test and calibration of the integrated sensors on the processor chip according to certain exemplary embodiments of the present invention.

Referring now to FIG. 2, a structure view 200 of a chip and a tester program for performing test and calibration of integrated sensors in a multi-core test environment is shown according to certain exemplary embodiments of the present invention.

In certain embodiments, a test and calibration device (not shown in FIG. 2) may include a tester program 210, a processor chip 220 to be tested and calibrated by the test and calibration device, and a storage device 230 storing various sensor test codes, and sensor test and calibration patterns. The processor chip 220 may be mounted on the test and calibration for testing and calibration. The processor chip 220 may include an on-chip service engine 222, an on-chip service engine memory 224, M cores 228 and N integrated sensors 226, where M and N are positive integers. The on-chip service engine 222 may be an on-chip highly optimized general purpose micro-controller. The on-chip service engine 222 may have its own instruction set architecture (ISA), and acts as a bridge between an external tester such as the computer system 100 and its intra-chip functional logic units such as various cores and integrated sensors. The on-chip service engine 222 is capable of performing any chip operations including test and calibration that the external tester program 210 wants to perform.

In certain embodiments, the on-chip service engine memory 224 may be a volatile memory, such as the random-access memory (RAM), for storing the data and information during the operation of test and calibration. The on-chip service engine memory 224 may also include a non-volatile data storage media for the tester program 210 and other applications. Examples of the on-chip service engine memory 224 may include flash memory, memory cards, USB drives, hard drives, floppy disks, optical drives, or any other types of data storage devices.

In certain embodiments, the storage device 230 may be a volatile memory of the computer system 100, such as the random-access memory (RAM), for storing the data and information during the operation of test and calibration. The storage device 230 may also include a non-volatile data storage media for storing various test codes or applications for testing and calibrating one or more integrated sensors. Examples of the storage device 230 may include flash memory, memory cards, USB drives, hard drives, floppy disks, optical drives, or any other types of data storage devices. The storage device 230 may be in communication with the test and calibration device and the processor chip 220 through direct connection or a network.

As shown in FIG. 2, the processor chip 220 may include various sensors 226 such as a first integrated sensor 226-1, a second integrated sensor 226-2, . . . , and N-th integrated sensor 226-N, and various cores 228 such as a first core 228-1, a second core 228-2, . . . , and M-th core 228-M. In certain embodiments, the integrated sensors may include: temperature sensors, voltage sensors, current sensors, process sensors, pressure sensors, microfluidics sensors, passive infrared (PIR) sensors, gas sensors, motion sensors, light sensors, acceleration sensors, displacement sensors, magnetic field sensors, critical path monitors (CPM) sensors, digital temperature sensors (DTS), and any sensors that can be integrated on the processor chip 220. The cores 280 may include certain number of good and fully functional cores. In certain embodiments, the cores 280 may even include certain number of "bad" or "not fully functional" cores.

In certain embodiments, a CPM is a sensor which is built by a series of delay elements and wires that simulate a timing critical path and is used for voltage droop sensing, timing margin detection, dynamic voltage and frequency scaling (DVFS) and other applications that are related to dynamic noise mitigation of processor chips. In utilizing integrated sensors (or on-chip sensors) to optimize the power and performance of a device, it can be challenging to accurately and quickly calibrate the various sensors during test. A serial calibration process can result in significant test time and associated costs. In addition, because the test pattern is usually implemented for specific test equipment, the test method is not easily ported to another test sector.

In certain embodiments, the hard disk 103 may store the tester program 210 for the computer system 100 for performing test and calibration of integrated sensors 226. In certain embodiments, when the tester program 210 is executed at the processor 101, the computer system 100 may perform: initializing, by the tester program 210, the on-chip service engine 222 of the processor chip 220 for performing test and calibration of one or more integrated sensors 226 on the processor chip 220, performing, by the on-chip service engine 222, test and calibration of the integrated sensors 226, and completing the test and calibration of the of the integrated sensors 226. The tester program may cause the computer system to perform: loading and decoding the tester program 210 into the on-chip service engine memory 224, testing and calibrating each integrated sensor 226-$i$, $i=1, 2, \ldots,$ and N, where N is a positive integer. The testing and calibrating may include: selecting an integrated sensor, loading one or more sensor test and calibration patterns for the selected integrated sensor, one or more sensor test and calibration parameters for the selected integrated sensor, and sensor test code for the selected integrated sensor from the storage device 230, executing the sensor test code to test and calibrate the integrated sensor selected according to the test and calibration patterns and parameters loaded, and writing results of the test and calibration to a predetermined location of the on-chip service engine memory 224.

In certain embodiments, when every integrated sensor 226-$i$ is tested and calibrated, the on-chip service engine 222 may write a return code of the test and calibration of the integrated sensors to another predetermined location of the on-chip service engine memory 224, indicating the completion of the testing and calibrating of the integrated sensors. The tester program, which has been polling for completion, decodes the return-code of the on-chip service engine 222 and then continues with its next steps.

In certain embodiments, a test and calibration of a CPM sensor is described here as an example. The processor chip 222 may be a multi-core integrated circuit for a microprocessor or processing unit. The on-chip service engine 222 may be a hardware device implemented as a micro-controller. The on-chip service engine 222 executes code that tests and calibrates a critical path monitor (CPM). After the tester program 210 initializes the on-chip service engine 222, it loads one or more sensor test and calibration patterns for the CPM, and sensor test code for the CPM from the storage device 230 to the on-chip service engine memory 224. The tester program 210 also may load one or more sensor test and calibration parameters for the CPM including a steady state workload to all of the processor cores 228-j, where j=1, 2, . . . , M, and M is a positive integer. The tester program 210 may evaluate the processor cores to determine if the temperature has reached a steady state. This is a pre-requisite for the CPM calibration, which requires steady state runtime conditions.

In certain embodiments, the tester program 210 may initiate test and calibration of the integrated sensors 226-i, i=1, 2, . . . , N, where N is a positive integer. The tester program 210 may initialize the on-chip service engine 222 of the processor chip 222 for performing test and calibration of the integrated sensors. The on-chip service engine 222 may load and decode the tester program into the on-chip service engine memory 224, and may load steady state workload to the cores 228-1, 228-2, . . . , and 228-M. The on-chip service engine 222 may go through each one of the one or more integrated sensors, in either sequential order or a predetermined order, test and calibrate these integrated sensors. For each of the integrated sensors, the on-chip service engine 222 may select one of the integrated sensors for testing and calibrating, load sensor test and calibration patterns, and sensor test and calibration parameters, and sensor test code from the storage device 230 for the selected integrated sensor into the on-chip service engine memory 224, execute the sensor test code for the selected integrated sensors to test and calibrate the selected integrated sensor according to the test and calibration patterns and the test and calibration parameters loaded, and write results of the test and calibration to a predetermined location of the on-chip service engine memory 224.

In one embodiment where a CPM is selected, the sensor test and calibration parameters may include sensor path delay parameter to the on-chip service engine 222. Then the on-chip service engine 222 may check to see if the CPM has reached a target value. Path delay refers to the tunable delay that one can add/remove from a selected CPM path. If the target value is not reached, the on-chip service engine 222 may determine if the sample space has been exhausted for the CPM. The path delay is a 6-bit value with a range from 0 to 63. When all the values are swept from 0 to 63, it means the sample space has exhausted. If the sample space has not been exhausted, the on-chip service engine 222 may iterate through the path delay sample space until the sample space has been exhausted.

When the sample space for the CPM has been exhausted, the CPM is marked accordingly. For example, the sensor may be marked as 'failed' or 'unsuccessful.' The on-chip service engine 222 may determine whether current sensor under test is the last sensor. If the current sensor under test is not the last sensor, another sensor is selected, tested and calibrated. When every integrated sensor is tested and calibrated, the on-chip service engine 222 may write a return code of the test and calibration of the integrated sensors to another predetermined location of the on-chip service engine memory 224 indicating the testing and calibrating is completed.

During the testing performed above, the tester program 210 is in a wait loop and checks for the on-chip service engine's 222 return code. When the tester program 210 receives the return code (either success or fail), it will then proceed with test execution on its next tasks.

Thus, the exemplary processes include the ability for the on-chip service engine 222 to interact with the tester program 210 to perform any type of on-chip integrated sensor test and calibration. The sensor test code may be sensor specific, and may be changed to suit the algorithm for any type of integrated sensors.

Figure 3:
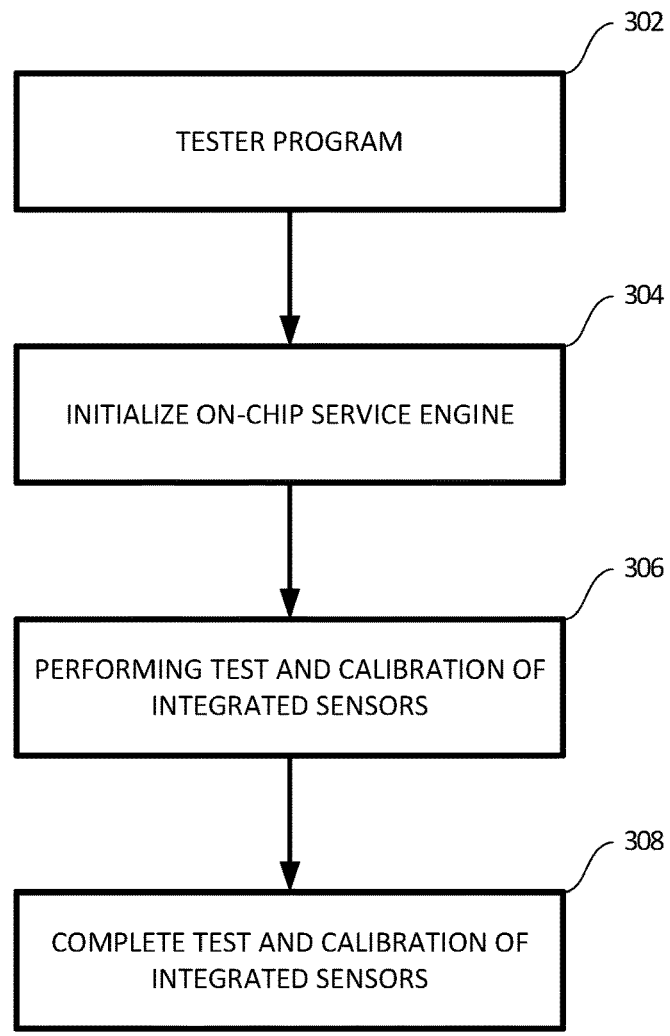
FIG. 3 is flow chart of an exemplary method for performing test and calibration of the integrated sensors on the processor chip according to certain embodiments of the present invention.

Referring now to FIG. 3, a flow chart of an exemplary method 300 performing test and calibration of integrated sensors of the processor chip is shown according to certain embodiments of the present invention.

At block 302, a tester program 210 may be provided to the computer system 100, and an operator may issue a test and calibration command to start a test and calibration of a processor chip 220 at the computer system 100. The processor chip 220 is mounted on a test and calibration device (not shown in FIGS. 1 and 2).

At block 304, the tester program 210 may initialize an on-chip service engine 222 to start the test and calibration of integrated sensors on the processor chip 220. In certain embodiments, when the tester program 210 is executed at the processor 101 of the computer system 100, the computer system 100 may initialize the on-chip service engine 222 of the processor chip 220 for performing test and calibration of one or more integrated sensors 226 on the processor chip 220 and trigger execution of the test and calibration of integrated sensors on the processor chip 220.

At block 306, once the test and calibration of integrated sensors on the processor chip 220 is triggered and started, the on-chip service engine 222 may performing the test and calibration of the integrated sensors. In certain embodiments, the performing the test and calibration of the integrated sensors may include: loading and decoding the tester program 210 into the on-chip service engine memory 224, and testing and calibrating each integrated sensor 226-i, i=1, 2, . . . , and N, where N is a positive integer. The testing and calibrating may include: selecting an integrated sensor, loading one or more sensor test and calibration patterns for the selected integrated sensor, one or more sensor test and calibration parameters for the selected integrated sensor, and sensor test code for the selected integrated sensor from the storage device 230, executing the sensor test code to test and calibrate the integrated sensor selected according to the test and calibration patterns and parameters loaded, and writing results of the test and calibration of the selected integrated sensor to a predetermined location of the on-chip service engine memory 224. In one embodiment, the sensor test code may be generic. In another embodiment, the sensor test code may be sensor specific.

At block 308, when every integrated sensor 226-i is tested and calibrated, the on-chip service engine 222 may write a return code of the test and calibration of the integrated sensors to another predetermined location of the on-chip service engine memory 224, indicating the completion of the testing and calibrating of the integrated sensors of the processor chip 220. The tester program 210 may be in a wait loop and constantly check for the return code from the on-chip service engine 222. Once the tester program 210 detects the return code, and decodes the return-code of the on-chip service engine 222, the test and calibration of integrated sensors of the processor chip 220 is completed. The tester program 210 may continue with its next testing tasks.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for performing test and calibration of one or more integrated sensors on a processor chip comprising a processor and a memory storing a tester program, the processor chip comprising:
    an on-chip service engine micro-controller; and
    the one or more integrated sensors formed directly on the processor,
    wherein the processor chip is configured to perform:
        initializing, by the tester program, an on-chip service engine of the processor chip for performing test and calibration of the one or more integrated sensors;
        performing, by the on-chip service engine, test and calibration of the one or more integrated sensors; and
        completing the test and calibration of the one or more integrated sensors,
        wherein the processor chip comprises the on-chip service engine, an on-chip service engine memory, and a plurality of the integrated sensors, the plurality of integrated sensors including at least one critical path monitor (CPM) sensor simulating a timing critical path that senses voltage droop of the processor chip, and wherein the processor chip performs testing and calibration of each integrated sensor among the plurality of sensors.

2. The computer system of claim 1, wherein the one or more integrated sensors comprises:
    temperature sensors;
    voltage sensors;
    current sensors;
    process sensors;
    pressure sensors;
    microfluidics sensors;
    passive infrared (PIR) sensors;
    gas sensors;
    motion sensors;
    light sensors;
    acceleration sensors;
    displacement sensors;
    magnetic field sensors;
    the at least one critical path monitors (CPM) sensor; and
    digital temperature sensors (DTS).

3. The computer system of claim 1, wherein the initializing comprises:
    loading the tester program into the on-chip service engine memory; and
    triggering execution of the test and calibration of the one or more integrated sensors.

4. The computer system of claim 3, wherein the performing comprises:
    decoding the tester program;
    loading the decoded tester program into the on-chip service engine memory; and
    executing the test and calibration of each of the one or more integrated sensors.

5. The computer system of claim 4, wherein the executing comprises:
    selecting one of the one or more integrated sensors for test and calibration;
    loading one or more sensor test and calibration patterns for the integrated sensor selected;
    loading one or more test and calibration parameters for the integrated sensor selected;
    loading sensor test code for the integrated sensor selected;
    executing the sensor test code to test and calibrate the integrated sensor selected according to the one or more test and calibration patterns and the one or more test and calibration parameters loaded; and
    writing results of the test and calibration of the integrated sensor selected to a first predetermined location of the on-chip service engine memory.

6. The computer system of claim 1, wherein the completing comprises writing a return code of the test and calibration of the one or more integrated sensors to a second predetermined location of the on-chip service engine memory, when each of the one or more integrated sensors is tested and calibrated.

7. A computer program product operable on a computer system for performing test on a chip having partial-good portions, comprising a non-transitory computer storage medium readable by the computer system having a processor and a memory configured to store a tester program for execution by the processor of the computer system for performing a method comprising:
    initializing, by the tester program, an on-chip service engine formed on a processor chip for performing test and calibration of one or more integrated sensors on the processor chip;
    performing, by at least one intra-chip functional logic unit of the on-chip service engine formed on the processor chip, test and calibration of the one or more integrated sensors; and
    completing the test and calibration of the of the one or more integrated sensors,
    wherein the processor chip comprises the on-chip service engine, an on-chip service engine memory, and a plurality of the integrated sensors, the plurality of integrated sensors including at least one critical path monitor (CPM) sensor simulating a timing critical path that senses voltage droop of the processor chip, and wherein the processor chip performs testing and calibration of each integrated sensor among the plurality of sensors.

8. The computer program product of claim 7, wherein the processor chip comprises the on-chip service engine, an on-chip service engine memory, and the one or more integrated sensors.

9. The computer program product of claim 8, wherein the initializing comprises: instructing the on-chip service engine to perform:
    loading the tester program into the on-chip service engine memory; and
    triggering execution of the test and calibration of the one or more integrated sensors.

10. The computer program product of claim 9, wherein the performing comprises:
    decoding the tester program;
    loading the decoded tester program into the on-chip service engine memory; and
    executing the test and calibration of each of the one or more integrated sensors.

11. The computer program product of claim 10, wherein the executing comprises:
    selecting one of the one or more integrated sensors for test and calibration;
    loading one or more sensor test and calibration patterns for the integrated sensor selected;
    loading one or more test and calibration parameters for the integrated sensor selected;
    loading sensor test code for the integrated sensor selected;

executing the sensor test code to test and calibrate the integrated sensor selected according to the one or more test and calibration patterns and the one or more test and calibration parameters loaded; and writing results of the test and calibration of the integrated sensor selected to a first predetermined location of the on-chip service engine memory.

12. The computer program product of claim 7, wherein the completing comprises writing a return code of the test and calibration of the one or more integrated sensors to a second predetermined location of the on-chip service engine memory, when each of the one or more integrated sensors is tested and calibrated.

\* \* \* \* \*